(12) United States Patent
Sha et al.

(10) Patent No.: US 11,854,567 B2
(45) Date of Patent: Dec. 26, 2023

(54) DIGITAL TWIN FOR MICROPHONE ARRAY SYSTEM

(71) Applicant: EMC IP Holding Company LLC, Hopkinton, MA (US)

(72) Inventors: Danqing Sha, Shanghai (CN); Amy N. Seibel, Newton, MA (US); Eric Bruno, Shirley, NY (US); Zhen Jia, Pudong (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 249 days.

(21) Appl. No.: 17/451,831

(22) Filed: Oct. 22, 2021

(65) Prior Publication Data
US 2023/0130245 A1   Apr. 27, 2023

(51) Int. Cl.
| | |
|---|---|
| *G10L 21/0232* | (2013.01) |
| *H04R 3/00* | (2006.01) |
| *G06T 19/00* | (2011.01) |
| *G10L 21/0208* | (2013.01) |
| *G10L 21/0216* | (2013.01) |

(52) U.S. Cl.
CPC ........ *G10L 21/0232* (2013.01); *G06T 19/006* (2013.01); *H04R 3/005* (2013.01); *G10L 2021/02087* (2013.01); *G10L 2021/02166* (2013.01)

(58) Field of Classification Search
CPC ................. G10L 21/0232; G10L 21/02; G10L 2021/02087; G10L 2021/02166; H04R 3/005; H04R 1/406; H04R 27/00; H04R 2227/001; H04R 2227/009; G06T 19/006; H04S 7/305; H04S 7/40
See application file for complete search history.

(56) References Cited

U.S. PATENT DOCUMENTS

| | | | | |
|---|---|---|---|---|
| 2008/0247584 | A1* | 10/2008 | Zhang | H04M 1/035 |
| | | | | 381/357 |
| 2020/0221220 | A1* | 7/2020 | Benattar | H04R 5/033 |
| 2021/0385573 | A1* | 12/2021 | Popa | H04R 1/406 |

* cited by examiner

*Primary Examiner* — Yogeshkumar Patel
(74) *Attorney, Agent, or Firm* — Workman Nydegger (57) ABSTRACT

One example includes a digital twin of a microphone array. The digital twin acts as a digital copy of a physical microphone array. The digital array allows the microphone array to be analyzed, simulated and optimized. Further, the microphone array can be optimized for performing sound quality operations such as noise suppression and speech intelligibility.

20 Claims, 5 Drawing Sheets

DIGITAL TWIN FOR MICROPHONE ARRAY SYSTEM

FIELD OF THE INVENTION

Embodiments of the present invention generally relate to microphone arrays and sound quality operations. More particularly, at least some embodiments of the invention relate to systems, hardware, software, computer-readable media, and methods for a digital twin of a microphone array.

BACKGROUND

A microphone array generally includes a set of microphones that are spaced apart from each other. Typically, the microphones included in the microphone array are arranged in a particular pattern. The microphone array works to produce an output signal or output signals based on the sounds received by the microphones in the array. Each microphone of the microphone array can be viewed as a sensor or spatial window for receiving an incoming signal. The output of the array is a superposition of each element of the array and in accordance with any processing performed on the outputs of the individual microphones or the output of the array.

Conventional microphone arrays operate with an acceptable level of performance, but there is no systematic optimization design, management, and evaluation tool that can optimize the operation and performance of the microphone array. Even if existing systems use test devices to measure an acoustic field in an environment, this is often inconvenient and does not account for changes in the environment or changes in sound that occurs in the environment. In addition, it is often difficult to visualize the real time performance of a microphone array. There is a need to improve the performance of microphone arrays.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to microphone arrays and sound related operations. More particularly, at least some embodiments of the invention relate to systems, hardware, software, computer-readable media, and methods for sound quality operations including optimizing the performance of microphone arrays.

More generally, embodiments of the invention relate to digital twins. A digital twin is a digital copy of a physical device or system. The following discussion focuses on a digital twin of a physical microphone array, multiple microphone arrays, or distributed microphone arrays. With the benefit of the present disclosure, any discussion of a single microphone array can be applied in a similar manner to multiple microphone arrays and distributed microphone arrays.

The digital twin can be used to evaluate, analyze, optimize, and control the operation and/or performance of a physical microphone array and/or other aspects of an environment in which the microphone array operates. The optimizations made to a microphone array are often manifested in other ways. For example, a microphone array can be used to sense noise in an environment. This allows an anti-noise signal to be generated and output in order to cancel the noise. Thus, sound quality operations such as optimizing noise suppression, improving speech intelligibility, and improving or optimizing other sound quality operations can be examples of or results of microphone array operations.

As stated in the previous example, the information collected or received by the microphone array can be used to generate a signal that is configured to cancel noise or other undesirable sounds in an environment. The digital twin can be used to improve the performance of the microphone array. Because the digital twin is a digital copy of the microphone array, the digital twin can be augmented with functions, machine learning, and the like to improve the performance of the microphone array and/or aspects of the environment. The digital twin can, by way of example only, analyze sound information, manipulate the sound information, perform simulations based on the sound information or based on "what-if" sound information, optimize device settings or parameters, or the like using real time data generated by the microphone array.

As used herein, sound information may include, but is not limited to, information, data or signals generated by a microphone array, environmental data (e.g., temperature, time), sound propagation models, environment (e.g., room) acoustic parameters, movement trajectory of sound sources or microphone arrays, microphone array parameters such as location, array geometry, array shading/tapers, array steering, radiation patterns, or the like or combination thereof. Sound information may also include characteristics of the sound itself such as sound level, sound type (e.g., speech, music, mechanical, traffic) or the like.

A microphone array can localize sounds using, for example, beamforming methods. Beamforming is a process that maps the position of acoustic sources by steering the array transducers towards different directions. Steering is achieved by processing the signals from the individual microphones to extract a desired signal and to reject interfering signals. This allows a microphone array to localize a sound source.

Advantageously, a digital twin facilitates design optimization, real time data visualization, real time status including sound field data, speech intelligibility, latency, power consumption, warning/alerts, and the like.

A user interface allows a user to interact with the digital twin and thus with the microphone array. The interaction of the user with the digital twin can be implemented in the physical microphone array, simulated in the digital twin, or the like.

For example, if the microphone array is unable to effectively localize a sound or a sound source in an environment, the digital twin can improve the operation and performance of the microphone array. Using the sound information (or portions thereof), the digital twin may be able to generate a recommendation to improve the performance of the microphone array. This recommendation may be further improved with user feedback.

For example, a user may know that noise (e.g., music) is being played from speakers in another room. If the microphone array (or overall sound quality system) is unable to adequately localize and suppress the noise (e.g., by generating an anti-sound signal), the visualization in the user interface may allow the user to identify the sound source and provide feedback. The user may indicate that the array needs to point in a different direction by clicking on a location in the user interface. This feedback allows the digital twin to change the directionality of any beamforming methods to better cancel the music.

This can be achieved without user input as well. For an array that is unable to localize a sound, the digital twin can process the information or data received/generated by the microphone array and then recommend a change in the array's pattern. The suggested change can be simulated by the digital twin. The suggested change can also be visualized in a user interface. Further, the digital twin allows the microphone array to be controlled and adjusted remotely.

Microphone arrays may come in different configurations. Example configurations include linear microphone arrays, planar microphone arrays, and 3-D microphone arrays. Microphone arrays may be integrated with many different devices including laptop computers, smart phones, smart speakers, interactive robots, televisions, or the like. The digital twin disclosed herein may be an independent application, a web-based application, deployed with smart devices, including AR/VR (Augmented Reality/Virtual Reality) headsets and the like.

The processing performed by the digital twin can be performed locally (e.g., at the microphone array), at a local device connected with the microphone array, at an edge server, in the cloud or the like. With a digital twin, a three-dimensional model of an environment or structure can be visualized and real time data and/or status for sound field data can be provided. Further, speech intelligibility, latency, power consumption, warnings, alerts, or the like can be provided or performed.

The digital twin may be configured to simulate a sound field based on inputs and allows the design of or configuration of microphone arrays to be optimized. The digital twin may include machine learning models and may be capable of performing data analytics. For example, the machine learning models perform analysis using or based on historical data, real-time data, and existing databases, predict future trends, and make suggestions for noise suppression or speech enhancement. The digital twin enables remote monitoring and remote control. This may allow a user to change or adjust parameters or settings for a real or physical microphone array remote by controlling the digital twin.

Figure 1:
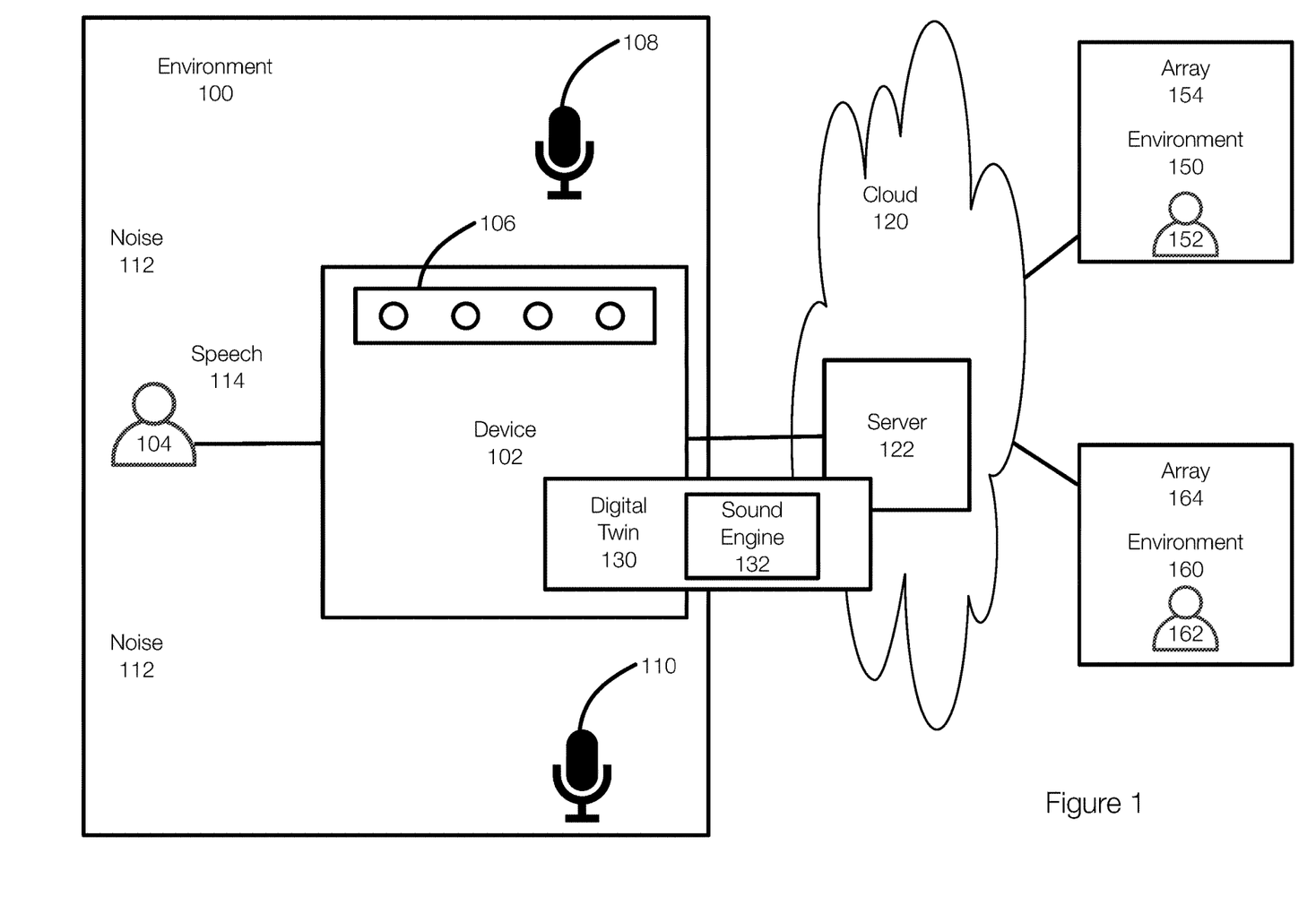
FIG. 1 discloses aspects of an environment that includes a microphone and a digital twin of the microphone array.

FIG. 1 illustrates an example of an environment that includes a microphone array and a digital twin of the microphone array. The environment 100 in FIG. 1 may be a room such as an office or a conference room, a building, a room of a house, or other area or location. In this example, a user 104 may be using a device 102 (e.g., laptop, tablet, smart phone or the like) for activities such as a conference call, an online meeting, streaming video and/or audio, or the like. A microphone array 106 may be integrated into the device 102. The array 106, may include one or more individual microphones.

In addition, microphone arrays 108 and/or 110 may be deployed in the environment 100. Each of the arrays 108 and 110 may include one or more individual microphones. Any number of microphone arrays may be deployed in the environment 100.

In this example, the arrays 108 and 110 may each have a wired/wireless connection with the device 102 and the device 102 may have a wired and/or wireless connection to the cloud 120. In this example, the device 102 is connected to a server 122 (e.g., an edge server, a datacenter server, a cluster or the like). Information or data from the microphone arrays may be delivered to the device directly, to the cloud via the device, and/or to the cloud directly.

The device 102 may also include or have access to a digital twin 130, which includes at least a digital copy of the array 106, the array 108, and/or the array 110. The digital twin 130 may include a sound engine 132 that is configured to perform sound quality operations using sound information. The sound engine 132 may include a machine learning model.

The computing resources needed by the digital twin 130 to perform the sound quality operations may be implemented at the device 102 and/or at the server 122 or elsewhere in the cloud or in an edge server or other suitable location or device. In some examples, the microphone arrays may also have some processing resources. In some examples, the digital twin 130 may be implemented at the device 102 only, in the cloud 120 only, or in both the device 102 and the cloud 120. The server 122, which may be an edge server, may perform some of the operations of or functions of the digital twin 130 or of the sound engine 132.

FIG. 1 illustrates environments 150 and 160, which may accommodate, respectively, users 152 and 154. The environment 150 may include an array 154 and the environment 160 may include an array 164. The environments 150 and 160 may also be associated with digital twins. Alternatively, the digital twin 130 may be configured to include digital copies of multiple microphone arrays in different environments. This allows the digital twin 130 to operate with distributed microphone arrays. Alternatively, multiple digital twins may operate as a federation.

FIG. 1 illustrates that the user 104 may be involved in communications, such as an online conference call, with users in other environments, such as the users 152 and 162. The array 106 may operates, by way of example, to ensure that speech of the users 152 and 154 can be heard by the user 104. This is achieved, in part, by generating a cancellation signal based on the sounds sensed by the array 106 (and/or the arrays 108 and 110. For example, the microphone array 106 may be used to cancel noise 112 in the environment 100. This allows the user 104 to hear speech of the users 152 and 162 that is output by the device 102. Further, the arrays 154 and 164 can be used to enhance the intelligibility of the speech of the users 152 and 162 that is delivered to the user 104 via the device 102. The digital twin 130 can operate to improve the performance of the array 106 and/or the arrays 154 and 164. Thus, the digital twin 130 can improve cancellation of the noise 112, prevent the noise 112 from impacting the ability of the user 104 to hear speech. The speech intelligibility of the user 152, as heard by other users, is improved by performing complementary sound operations in multiple environments.

The digital twin 130 is configured to present the user 104 with a visualization of the sound in the environment 100.

The digital twin 130 may include or have access to models including room models, array models, sensor models, acoustic models, propagation models, or the like. The digital twin 130 can be built or operated using historical data, real time performance data, environmental data, user data, user feedback, and the like.

Figure 2:
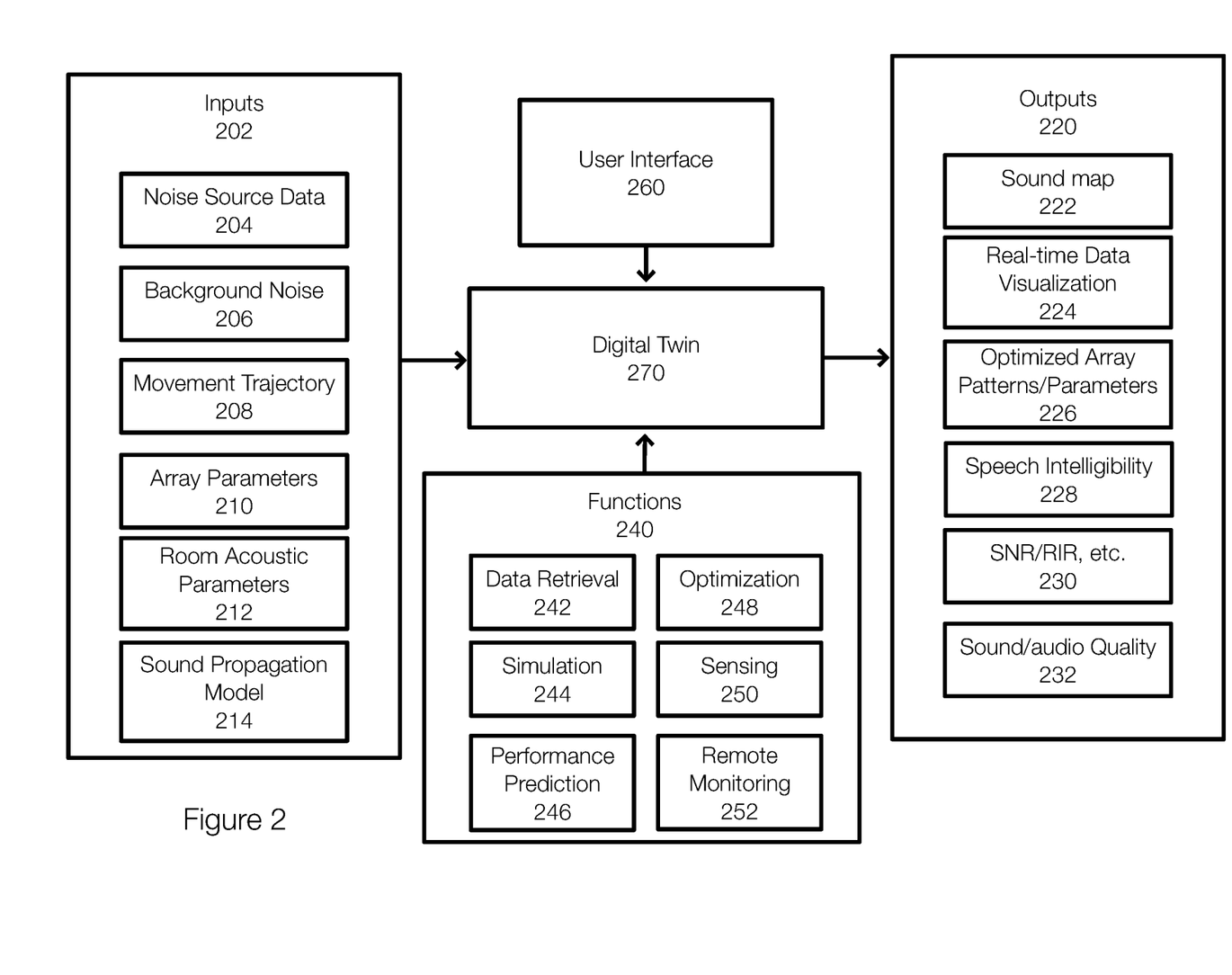
FIG. 2 discloses aspects of a digital twin.

FIG. 2 illustrates an example of a digital twin implemented in an environment. The digital twin 270 may be configured to receive inputs 202 (examples of sound information) such as noise source data 204, background noise 206, movement trajectory 208, array parameters 210, room acoustic parameters 212, sound propagation model 214, and the like or combination thereof. Some of these inputs 202 may be received via a microphone array.

The noise source data 204 may include information about different types of noise such as transportation noise, construction noise, domestic noise, or the like. The background noise 206 may include the sounds or noise captured by the physical microphone array. The movement trajectory 208 may include information related to movement of sound sources in the environment. The array parameters 210 may include locations of the arrays, geometry of the arrays, array shading and tapers, array steering, radiation patterns, or the like. The room acoustic parameters 212 may include sound strength, reverberance, clarity, and the like. The sound propagation model 214 may include information related to how sound propagates in an environment.

The inputs 202 allow the digital twin 270 to digitally mimic the operation of the physical microphone array. With these inputs 202, the digital twin 270 can perform various functions 250 including, but not limited to, data retrieval 242, optimization 248, simulation 244, sensing 250, performance prediction 246, and remote monitoring 252.

Data retrieval 242 may include real-time data retrieval. The data retrieved may include sound information such as location, loudness, or the like. Optimization 248 may include making adjustments to improve the performance of the physical microphone array such that the sound environment is improved (e.g., better noise cancellation, better echo cancellation, improved speech intelligibility).

The simulation 244 allows the impact of changes or adjustments to the microphone array to be previewed. For example, the simulation 244 may allow the digital twin 270 to determine how a change in the array parameters (e.g., array pattern change) may impact the performance of the array or more generally how the changes impact. In other words, will a change in the array pattern improve or worsen noise cancellation or sound localization. More generally, the array is adjusted to ensure that the user is able to hear the desired sound clearly while reducing the impact of undesired sounds or signals.

Sensing 250 allows the digital twin 270 to identify sound sources and locations, source new sound sources, or the like. The performance prediction 246 indicates how the array will perform over time. For example, a moving sound source may not be adequately cancelled and performance may be expected to worsen absent adjustment. The remote monitoring 252 allows a remote entity to potentially control the microphone array. For example, an employer may adjust an employee's microphone array to improve the work environment. Similarly, online learning could be improved so that remote students can better understand the teacher or comments from other students.

The digital twin 270 may also generate outputs 220. The outputs 220 may include a sound map 222, a real-time data visualization 224, optimized array patterns/parameters 226, speech intelligibility 228, SNR/RIR 230, and sound/audio quality 232. The outputs 220 may include an acoustic field or sound map that identifies locations and levels of sound or noise sources and room impulse responses.

The outputs 220 may include information related to single microphone arrays and/or to distributed microphone arrays. This information may include optimizing the microphone array directivity index, spatial structures, filter weights, and the like. Spatial resolution, speech indelibility, power consumption, directivity index, and the like are examples of outputs 220. The digital twin 270 may also provide objective metrics such as PESQ (perceptual evaluation of speech quality), STOI (short-time objective intelligibility) and frequency weighted SNR (Signal-noise ratio).

Optimizations can be made manually or automatically. Manual optimization may be based on simulations. A user can input different parameters into the digital twin 270, an example of the digital twin 130, to run simulations and output a simulated performance index such as noise level, speech intelligibility and the like. Based on the simulated results, a user can manually select and implement the best options for noise suppression and speech enhancement. These options or changes may relate to microphone sensitivity, array pattern, beamforming parameters, or the like.

Automatic optimization may be based on machine learning. The digital twin 270 may include a machine learning model (e.g., the sound engine) that can generate insights, optimize noise suppression and speech enhancement. The digital twin can provide noise cancellation decisions and monitor processes remotely. More specifically in one example, the digital twin may generate recommended array changes to improve noise cancellation or for other optimizations. As input is continually received into the digital twin, the digital twin 270 can continually make adjustments to the microphone array. The digital twin 270 may also perform simulation or perform other sound quality operations.

The digital twin 270 is also associated with a user interface 260. The user interface 260 may be web based, 3D model based, AR glass, or the like. The outputs 220 can be presented visually in the user interface 260. The user interface 260 may present relative locations of sound sources, human speech, noise, or the like visually. Sound information may also be provided in the user interface 260 for each of the sound sources. The sound information or outputs may be overlaid onto the sound sources in the display.

The user can interact with the sound information in the user interface 260. For example, selecting a sound source may allow more information about the selected sound source to be viewed. A user can simulate or make actual changes to the displayed information, or the like. A user may provide feedback that a particular sound source is not sufficiently cancelled or is not properly located, or the like.

The digital twin 270 allows the status and performance of the microphone array to be visualized in real time. The results of simulations can be viewed. Assumptions about noise suppression and speech enhancement can be tested in the digital twin 270.

Figure 3:
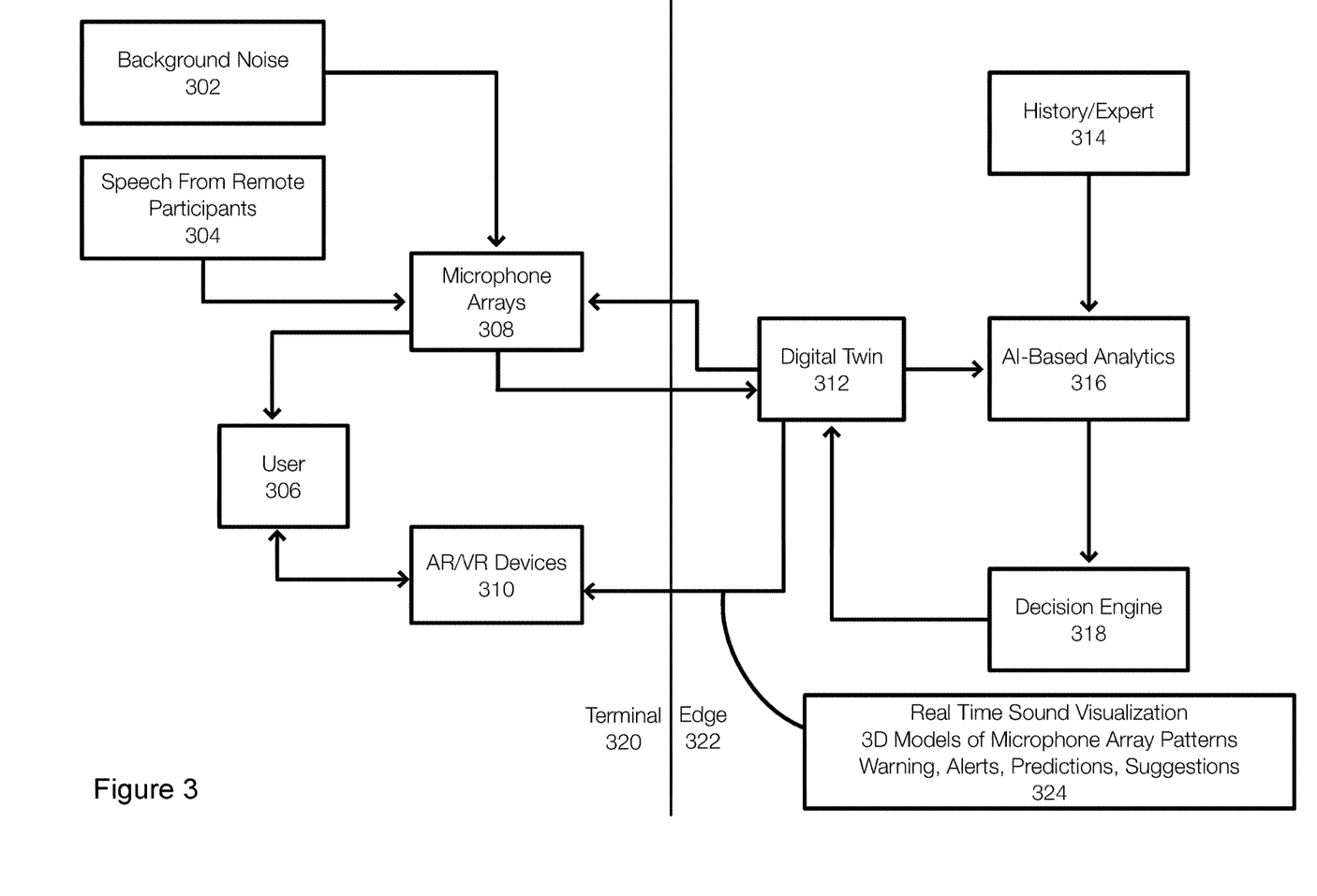
FIG. 3 discloses aspects of a digital twin operating in an environment.

FIG. 3 illustrates an example of a digital twin operating in an environment. FIG. 3 illustrates a device 320 side and cloud or edge 322 side. The device side 320 relates to the user 306 and the user's environment. The edge 322 side refers to the edge or the cloud, in which the digital twin 312 may be at least partially implemented. This arrays 308 operate in the user's environment while allowing processing, including compute intensive processing, to be performed in the edge 322, which has more powerful computing resources.

In this example, microphone arrays 308 are present in an environment of the user 306. The user 306 may also be associated with a user interface such as AR/VR devices 310. The microphone arrays 308 represent the microphone array associated with the user 306 as well as microphone arrays that may be associated with remote users. Inputs to the microphone arrays 308 may include background noise 302 and speech from remote participants 304. More specifically, the microphone array 308 associated with the user 306 may sense sound in the user's environment. In addition, speech from remote participants 304 that is output by speakers associated with the user 306 may also be sensed or picked up by the microphone array 308. The microphone arrays of other users may operate similarly.

The output of the microphone arrays 308 is input to a digital twin 312. The digital twin 312 may have access to AI based analytics 316 (e.g., a machine learning model such as a sound engine) that is trained on history or expert 314 data. By extracting features from the output of the microphone arrays 308, the analytics 316 may provide insights or other output to a decision engine 318 that may make a decision or recommendation. For example, the analytics 316 may recommend a change in the pattern of the microphone arrays 308 (e.g., turn specific microphones on/off). This decision can be provided to the digital twin 312 and simulated if desired. This decision can also be implemented at the microphone arrays 308.

The digital twin 312 may also provide other outputs 324 to user interface devices such as AR/VR devices 310. This may include real time sound visualization, 3D models of microphone array patterns, warnings, alerts, predictions, and suggestions. The sound information included in the output 310 may be overlaid onto sound sources in the devices 310 or presented to the user. The user can then interact with these outputs. For example, in setting up a classroom environment with multiple related devices, an administrator could model multiple scenarios with different noise levels, different noise locations, and different array placements to determine the result. This type of simulation and testing can allow a configuration to be implemented that is most conducive to learning and that best reduces or suppresses noise while enhancing desired signals such as desired speech.

The digital twin 312 may include or have access to different models including reduced order models for microphone arrays that can be used as a visualization and interaction interface, a 3D model for environment or room layout, and 3D models for other sensors if present. The data used to construct the digital twin 312 may include historical data and real time performance data, environmental data, user data, User feedback, noise source data, movement trajectory, or the like.

Simulations can be used to simulate the acoustic environment and the microphone array performance. Machine learning or artificial intelligence can be used to implement noise suppression, speech enhancement, anomaly prediction, configuration optimization or the like.

Using AR/VR devices 310 with the digital twin 312 allows data to be visualized in a 3D environment. This type of user interface allows the user to interact with the model through a virtual environment. The user can view the 3D model and the data in real-time from multiple perspectives. Data that can be visualized includes microphone array system model and architecture, data that are interpreted and contextualized, and simulation outputs. Analyzed data, warnings, alerts, operation suggestions can also be visualized. These different categories of virtual information can be automatically popped up in the device. A user can use gestures or other controls to pull out information that interests the user. User can interact with them, get insights, make decisions, test assumptions, run simulations, and/or take other actions. The visualization could also be independent application or could be web based.

Pairing the virtual digital twin with a physical microphone array allows analysis of data and monitoring of systems to head off problems before they even occur, prevent downtime, develop new opportunities, and even plan for the future by using simulations.

Using data from multiple sources, a digital twin continuously learns and updates itself to represent the current working condition of the microphone array system, make optimization suggestions, make predictions about future status, or the like. The machine learning based analytics results in suggestions for noise suppression and speech enhancement, and makes predictions for future trends, such as: suggestions on optimization of microphone array patterns or types (e.g. periodical, nonperiodical, and logarithmic microphone line arrays, etc.), recommendations for current & future adjustments for settings, predictions on future room acoustics performance, or the like.

The data sources for the machine learning model, or the digital twin may include: physical parameters of microphone array, sensing data, historical and real time sound/noise source parameters, historical and real time microphone array performance data, movement trajectory of sources and microphone arrays in room, expert models or knowledge database, user feedback on settings, remote monitoring and collaboration, or the like or combination thereof.

With a digital twin, the user does not need to access the physical system to check the status or performance. Status and performance can be checked in the digital twin, which allows for remote monitoring.

When an issue occurs, the digital twin provides remote collaboration. The visualization can be shared for example. This allows the user and/or a remote user to try and resolve the issue or to simply work together.

The digital twin provides visibility into the performance of the microphone array. The digital twin can predict future state of the microphone array system using simulation and modeling. The digital twin allows a user to interact with the digital twin to perform a what-if analysis. Optimal solutions and setups can be and developed. The digital twin also allows the microphone array to be cope and adapt to changing environments. The real time modeling performed by the digital twin allows beamforming to be conducted on-the-fly to dynamically focus the microphones and optimize noise cancelling and perform other functions. The real time modeling could be used in advance to predict the correct starting settings when a new environment is set up and/or there are projected changes to an existing environment.

The digital twin includes machine learning based optimizations, which may be automatic, and manual optimizations. The digital twin can generate insights for users to optimize noise suppression and speech enhancement.

The digital twin also enable remote monitoring. In one example, this allows products to be diagnosed or operated remotely. This may lower costs and improve customer satisfaction. AR/VR allows users to manipulate the microphone array systems. However, users could opt-out of remote monitoring.

Generally, the digital twin may ingest large amounts of data and AR and VR provide immersive experiences to visualize these insights. Further, visualization can be performed at multiple layers. For example, an end user view may provide visualization into the microphone array of the end user. A view may be provided into all systems in a network (an administrator view).

Digital twins involve ingesting large volumes of data to arrive at actionable insights. AR and VR offer immersive experiences to visualize such insights. A stakeholder can interact with a wearable or a hand-held AR/VR device to consume insights and queries in a context-aware manner. Integrating AR/VR with Digital twin can help users quickly and effectively view information in context from the digital twin.

The digital twin allows remote interaction with microphone arrays at various levels, such as the end user's system (end user view, with just one system), all systems within a network (admin view) or the like. With a user's permission, multiple arrays can be viewed and adjusted simultaneously.

Figure 4:
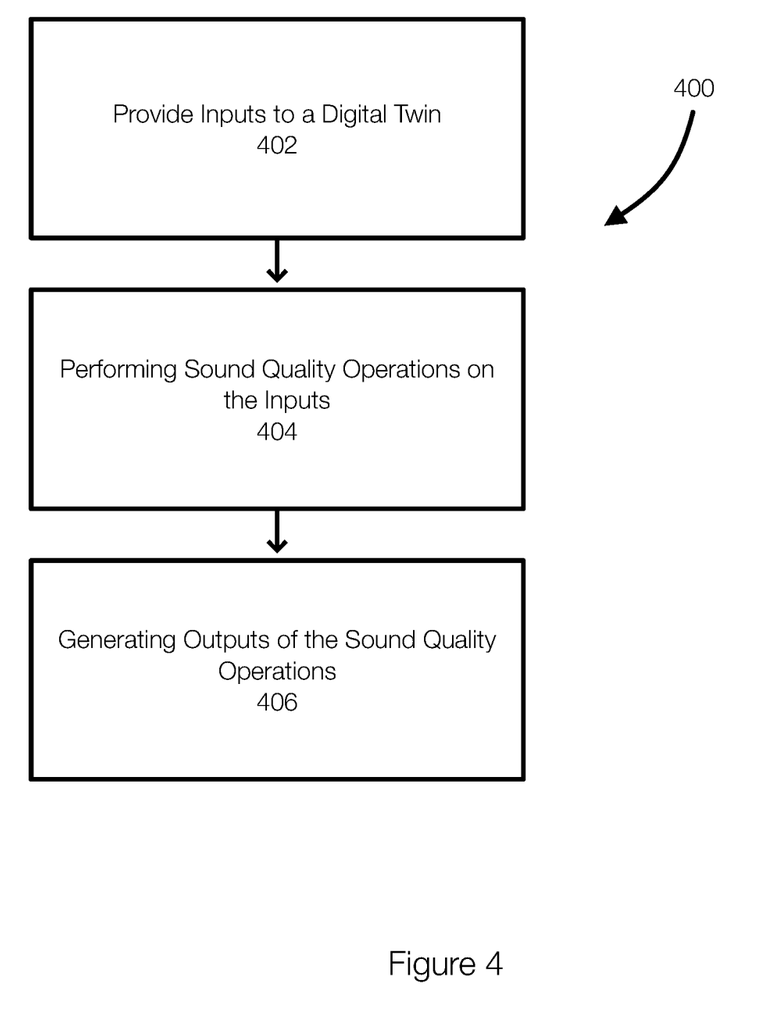
FIG. 4 discloses aspects of a method for a digital twin.

FIG. 4 discloses aspects of a method for a digital twin. Initially, inputs are provided to or received 402 by a digital twin in the method 400. The inputs may be provided by a microphone array. For example, the microphone may sense sound from sound sources such as background noise, speech from other users (played from a user's device) or the like. The inputs to the digital twin may also include other factors that do not come from the microphone array. The inputs may also include array parameters, steering parameters, or the like.

Next, the digital twin performs 404 sound quality operations on the inputs. The sound quality operations may include, but are not limited to, sound localization operations, noise cancellation operations, which may include generating a cancellation signal, simulation operations, speech enhancement operations, array pattern operations, remote monitoring operations, or the like.

After performing the sound quality operations, which may be performed repeatedly or continually, outputs are generated 406. The outputs may be implemented as well. The outputs may include adjustments to the microphone array, a noise cancellation signal, speech improvement, sound locations, sound types, and the like.

In some examples, these operations are performed using machine learning. A machine learning model, trained using historical and/or expert data or the like.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), or containers.

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving inputs into a digital twin, the inputs including sound information from a microphone array, performing sound quality operations based on the inputs by the digital twin, wherein the digital twin includes a digital copy of the microphone array, generating outputs of the sound quality operations.

Embodiment 2. The method of embodiment 1, further comprising presenting a visual representation of the outputs in a user interface of a device.

Embodiment 3. The method of embodiment 1 and/or 2, wherein the device comprises an augmented reality or virtual reality device.

Embodiment 4. The method of embodiment 1, 2, and/or 3, wherein the inputs include background noise, speech from remote participants, speech from other users in the environment, environment acoustics parameters, movement trajectory, a sound wave propagation model, and array parameters.

Embodiment 5. The method of embodiment 1, 2, 3, and/or 4, wherein the array parameters include a location of the microphone array, an array geometry, array steering, and radiation patterns.

Embodiment 6. The method of embodiment 1, 2, 3, 4, and/or 5, further comprising generating an sound map that identifies locations and levels of noise sources and room impulse responses.

Embodiment 7. The method of embodiment 1, 2, 3, 4, 5, and/or 6, further comprising generating, for the microphone array, optimized parameters including array pattern directivity index, spatial structure, filter weights, spatial resolution, speech indelibility, power consumption, perceptual evaluation of speech quality, short-time objective intelligibility, and frequency-weighted signal to noise ratio.

Embodiment 8. The method of embodiment 1, 2, 3, 4, 5, 6, and/or 7, further comprising receiving feedback from a user and performing the sound operations using the user feedback.

Embodiment 9. The method of embodiment 1, 2, 3, 4, 5, 6, 7, and/or 8, further comprising performing a simulation by the digital twin.

Embodiment 10. A method for performing any of the operations, methods, or processes, or any portion of any of these, or any combination thereof, disclosed herein.

Embodiment 11. A non-transitory storage medium having stored therein instructions that are executable by one or more hardware processors to perform operations comprising the operations of any one or more of embodiments 1 through 10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instruction and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
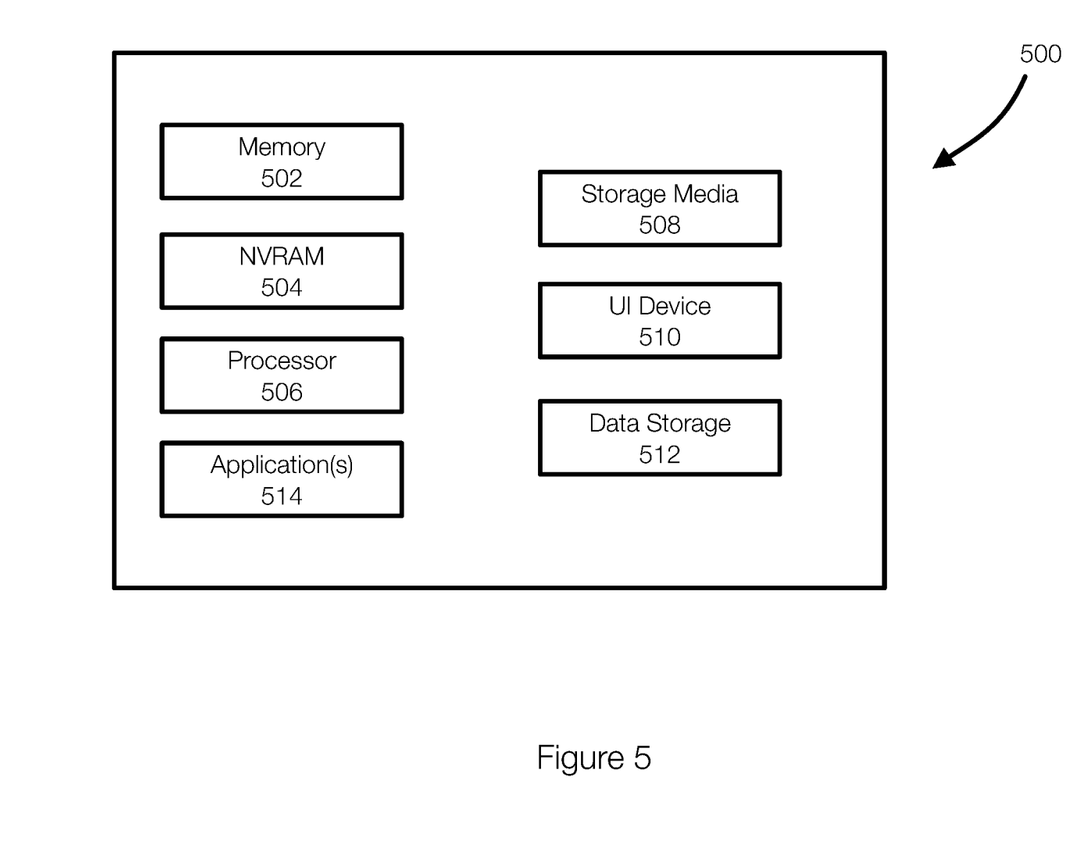
FIG. 5 discloses aspects of a computing device or a computing system.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving inputs into a digital twin, the inputs including sound information from a microphone array deployed in an environment;
   performing sound quality operations based on the inputs by the digital twin, wherein the digital twin includes a digital copy of the microphone array;
   generating outputs of the sound quality operations.

2. The method of claim 1, further comprising presenting a visual representation of the outputs in a user interface of a device.

3. The method of claim 2, wherein the device comprises an augmented reality or virtual reality device.

4. The method of claim 1, wherein the inputs include background noise, speech from remote participants, speech from other users in the environment, environment acoustics parameters, movement trajectory, a sound wave propagation model, and array parameters.

5. The method of claim 4, wherein the array parameters include a location of the microphone array, an array geometry, array steering, and radiation patterns.

6. The method of claim 1, further comprising
   generating a sound map that identifies locations and levels of noise sources and room impulse responses.

7. The method of claim 6, further comprising generating, for the microphone array, optimized parameters including array pattern directivity index, spatial structure, filter weights, spatial resolution, speech indelibility, power consumption, perceptual evaluation of speech quality, short-time objective intelligibility, and frequency-weighted signal to noise ratio.

8. The method of claim 1, further comprising receiving feedback from a user and performing the sound operations using the user feedback.

9. The method of claim 1, further comprising performing a simulation by the digital twin.

10. A non-transitory storage medium having stored therein instructions that are executable by one or more hardware processors to perform operations comprising:
    receiving inputs into a digital twin, the inputs including sound information from a microphone array;
    performing sound quality operations based on the inputs by the digital twin, wherein the digital twin includes a digital copy of the microphone array;
    generating outputs of the sound quality operations.

11. The non-transitory storage medium of claim 10, further comprising presenting a visual representation of the outputs in a user interface of a device.

12. The non-transitory storage medium of claim 11, wherein the device comprises an augmented reality or virtual reality device.

13. The non-transitory storage medium of claim 10, wherein the inputs include background noise, speech from remote participants, room acoustics parameters, movement trajectory, a sound wave propagation model, and array parameters.

14. The non-transitory storage medium of claim 13, wherein the array parameters include a location of the microphone array, an array geometry, array steering, and radiation patterns.

15. The non-transitory storage medium of claim 10, further comprising
    generating a sound map that identifies locations and levels of noise sources and room impulse responses.

16. The non-transitory storage medium of claim 10, further comprising generating, for the microphone array, optimized parameters including array pattern directivity index, spatial structure, filter weights, spatial resolution, speech indelibility, power consumption, perceptual evaluation of speech quality, short-time objective intelligibility, and frequency-weighted signal to noise ratio.

17. The non-transitory storage medium of claim 10, further comprising receiving feedback from a user and performing the sound operations using the user feedback.

18. The non-transitory storage medium of claim 10, further comprising performing a simulation by the digital twin.

19. A non-transitory storage medium having stored therein instructions that are executable by one or more hardware processors to implement a digital twin of a physical device, the digital twin comprising:
    an input configured to receive noise source data, background noise, movement trajectory, array parameters, room acoustic parameters, and a sound propagation model;

functions including data retrieval functions, optimization functions, simulation functions, sensing functions, performance prediction functions, and remote monitoring functions;

an output configured to generate outputs including a sound map, real-time data visualization, optimized array patterns and parameters; speech intelligibility, signal to noise ratio, and sound quality.

20. The non-transitory storage medium of claim 19, the digital twin further comprising a user interface configured to visualize at least some of the outputs.

* * * * *